United States Patent [19]

Nakano et al.

[11] Patent Number: 5,606,684

[45] Date of Patent: Feb. 25, 1997

[54] ON-LINE DUMPING SYSTEM AND DISK SUB-SYSTEM

[75] Inventors: Toshio Nakano; Masafumi Nozawa; Kiyoshi Hisano, all of Odawara; Akihito Ogino, Kanagawa-ken; Akira Kurano, Odawara; Hiroyuki Kitajima; Akihiko Togawa, both of Yokohama, all of Japan

[73] Assignee: Hitachi, Ltd., Tokyo, Japan

[21] Appl. No.: 319,775

[22] Filed: Oct. 7, 1994

Related U.S. Application Data

[63] Continuation of Ser. No. 583,311, Sep. 17, 1990, Pat. No. 5,410,666.

[30] Foreign Application Priority Data

Sep. 22, 1989 [JP] Japan .................................. 1-247320

[51] Int. Cl.⁶ .................................................. G06F 13/00
[52] U.S. Cl. ...................................... 395/441; 395/250
[58] Field of Search ...................................... 395/425, 325, 395/725, 250, 700, 427, 478, 481, 485, 441

[56] References Cited

U.S. PATENT DOCUMENTS

| | | | |
|---|---|---|---|
| 4,399,503 | 8/1983 | Hawley | 395/325 |
| 4,467,421 | 8/1984 | White | 395/425 |
| 4,476,524 | 10/1984 | Brown et al. | 395/425 |
| 4,476,526 | 10/1984 | Dodd | 395/425 |
| 4,523,206 | 6/1985 | Sasscer | 395/425 |
| 4,525,801 | 6/1985 | Kuwabara | 395/425 |
| 4,607,346 | 8/1986 | Hill | 395/425 |
| 4,675,807 | 6/1987 | Gourneau et al. | 395/275 |
| 4,779,196 | 10/1988 | Manga | 395/325 |
| 4,780,808 | 10/1988 | Moreno et al. | 395/425 |
| 4,807,180 | 2/1989 | Takeuchi et al. | 395/425 |
| 4,849,929 | 7/1989 | Timsit | 395/575 |
| 4,888,691 | 12/1989 | George et al. | 395/700 |
| 5,016,121 | 5/1991 | Peddle et al. | 360/39 |
| 5,133,060 | 7/1992 | Weber et al. | 395/425 |
| 5,140,683 | 8/1992 | Gallo et al. | 395/425 |

FOREIGN PATENT DOCUMENTS

| | | |
|---|---|---|
| 4006986 | 9/1990 | Germany . |
| 57-90770 | 6/1982 | Japan ........................... G06F 13/04 |
| 57-146359 | 9/1982 | Japan ........................... G06F 13/04 |

OTHER PUBLICATIONS

IEEE Standard Dictionary of Electronical And Electronics Terms 2nd Edition, IEEE Std 100—1977, Frank Jay.

*Primary Examiner*—Ayaz R. Sheikh
*Attorney, Agent, or Firm*—Antonelli, Terry, Stout & Kraus, LLP

[57] ABSTRACT

A buffer memory capable of storing contents of a plurality of tracks of a disk volume is provided in a disk controller or a disk drive, and in dump processing requested by a higher rank unit (CPU) to the disk controller, the data is immediately transferred from the buffer memory if the data to be dumped is present in the buffer memory, and if the data to be dumped is not present in the buffer memory, dump prefetching into the buffer memory is started and the execution of the dump processing is interrupted so that an on-line input/output operation other than the dump processing is accepted. When the dump prefetching into the buffer memory is over, the interrupted dump processing is resumed.

7 Claims, 5 Drawing Sheets

ON-LINE DUMPING SYSTEM AND DISK SUB-SYSTEM

This is a continuation of application Ser. No. 07/583,311, filed Sep. 17, 1990 which is now U.S. Pat. No. 5,410,666.

BACKGROUND OF THE INVENTION

The present invention relates to a disk subsystem, and more particularly to an on-line dumping system and disk sub-system which perform high speed and high efficient dump processing without affecting on-line processing when dump processing for the magnetic disk sub-system is dumped.

In order to enhance the reliablity of a system of the magnetic disk sub-system, it is a common practice to dump data on another recording medium (such as a magnetic tape). Various techniques to reduce the amount of processing and enhance the performance of the dump processing have been proposed. For example, in a system disclosed in JP-A-57-90770, a disk controller stores position information of updated data blocks (such as tracks), and a higher rank unit dumps only the updated data blocks based on the above information in order to attain high efficient dumping.

On the other hand, in a large scale magnetic disk sub-system in which one controller controls a plurality of disk drives, while the controller services to one disk volume, an interruption by end of waiting of rotation for other disk volume is not accepted by the controller or the host unit.

The interruption by end of waiting of rotation means that the arrival of a head to a target position is reported to the higher rank unit and read/write is commanded to that record. If the controller or higher rank unit is in use at that time, a wait time for another rotation is required. A method for solving this problem is disclosed in JP-B-62-3455. In this method, when information is read from the disk drive and transferred to the higher rank unit, if the disk drive or the higher rank unit is in use and the coupling is not permitted when the interruption by end of waiting of rotation is issued, the content of the disk drive is written into a buffer memory provided for each disk drive, and when the disk controller or the higher rank unit is no longer in use, the information stored in the buffer is transferred to the disk controller.

JP-A-57-90770 aims at the reduction of the amount of dump, that is, the reduction of dump processing by operation, but does not pay consideration on the affect of the dump processing to the on-line processing. If the updated portion is small, the affect to the on-line processing will be small, but if a proportion of the updated portion between the previous dump processing and the start of the current dump processing is large, the affect of the dump processing on the on-line processing is material. In an extreme case, if all areas are updated, the entire data must be dumped.

In JP-B-62-3455, when the disk controller or the higher rank unit is busy and cannot accept the data transfer, the wait time for one rotation can be reduced. However, no consideration is paid to the dump processing for the track to be next processed. Further, as described above, no consideration is paid to the recognition of the on-line processing and the dump processing.

SUMMARY OF THE INVENTION

It is an object of the present invention to provide on-line dumping system and disk sub-system which minimize an affect of the dump processing on the on-line processing.

It is another object of the present invention to provide on-line dumping system and disk sub-system which reduce a busy rate of a higher rank unit or a disk controller due to the dump processing and permit high speed dumping without affect the on-line processing.

It is other object of the present invention to provide on-line dumping system and disk sub-system which reduce the busy rate of the higher rank unit or the disk controller even in differential dump processing which can reduce the amount of dump in order to attain high efficient differential dump processing without affecting the on-line processing.

In order to achieve the above objects, in accordance with the on-line dumping system of the present invention, a disk controller dumps the content of a disk drive during the on-line processing in accordance with an instruction from a higher rank unit. The disk controller discriminates a request for the dump processing from the higher rank unit to the disk controller and requests other than the request for the dump processing.

Preferably, the higher rank unit controls the dump processing request and the on-line processing request in a queue, and when they compete, a priority is given to the on-line processing. The disk controller controls the processing requests to the higher rank unit in a queue, and a priority is given to the on-line processing request than the dump processing request, when they compete.

From another aspect of the dumping system of the present invention, a content of a disk volume of the disk drive is dumped during the on-line processing. A buffer memory which can store a plurality of tracks of the disk volume is provided in the disk controller or the disk drive. When the higher rank unit issues a command chain for the dump processing to the disk controller, a dump processing command which designates a range of dump processing by the command chain and commands to check whether the designated range is present in the buffer memory is added at the beginning of the command chain. If the designated range is present in the buffer memory, the data transfer is immediately carried out from the buffer memory. If the designated range is not present in the buffer memory, the dump prefetching into the buffer memory is started and the execution of the command chain for the dump processing is interrupted so that the on-line input/output requests other than the dump processing may be accepted. When the dump prefetching into the buffer memory has been completed, a request is issued to the higher rank unit so that the interrupted command chain for the dump processing is resumed from the beginning.

Preferably, when the designated range is not present in the buffer memory, the dump prefetching into the buffer memory is interrupted when an on-line input/output request other than the dump processing is received during the interruption of the command chain for the dump processing, to execute the on-line input/output operation. After the completion of the input/output operation, the execution of the command chain for the dump processing is resumed from the beginning.

Where the differential dump processing in which only the areas updated between the previous dump processing and the start of the current dump processing are dumped is executed, a dump processing command which designates the range of the updated area is added at the beginning of the command chain for the differential dump processing.

The disk sub-system of the present invention comprises a disk controller and a plurality of disk drives controlled by the disk controller, and each of the disk drives is provided with a dump processing buffer memory for storing contents of a plurality of tracks designated by a dump processing command.

In another aspect of the present invention, the disk subsystem comprises a disk controller and a plurality of disk drives controlled by the disk controller, and the disk drives are provided with a dump processing buffer memory for storing contents of a plurality of tracks designated by a dump processing command. The buffer memory may be constructed by using a portion of a cache memory in the disk controller.

When the higher rank unit receives a dump processing request, it stores the request in a queue. Since the dump processing request has a lower priority than an on-line input/output request, it has to wait in the queue if there is an on-line input/output request in the same queue, but if there is no on-line input/output request, the higher rank unit issues a prefetch command with a range designation parameter to designate a range of the dump processing by the command chain.

In the differential dump processing, the update information is added to the range designation parameter.

When the disk controller receives the command, it checks whether the designated range is present in the buffer memory or not. If the designated range is not present in the buffer memory, the disk controller commands the prefetching into the buffer memory and informs to the higher rank unit that the designated range is not present in the buffer memory to interrupt the dump processing. The higher rank unit accepts it and stores the dump processing in the queue. Under this condition, the on-line input/output request from the higher rank unit (other system) other than the higher rank unit which issued the dump processing command may be accepted.

Where the on-line input/output request from the other system is to the disk drive, the prefetching to the buffer memory is interrupted and the on-line input/output request is executed. The interruption is reported to the higher rank unit which issued the dump processing request and the higher rank unit is requested to reissue the command chain for the dump processing.

The interruption of the prefetching is done at a track boundary, and when the command chain is reissued, the disk controller or the disk drive fetches only the remaining tracks so that the tracks already fetched are not wasted. Since the command chain is reissued from the beginning of the command chain, the processing is simple and the number of commands need not be increased.

When the prefetching is over, it is reported to the higher rank unit as is done for the interruption to request to the higher rank unit to reissue the command chain for the dump processing. In this case, since the designated range is already present in the buffer memory because it is the second issuance of the prefetch command, it is reported to the higher rank unit and the data is immediately transferred from the buffer memory. When the request to resume the dump processing is issued to the higher rank unit, interruption is noticed to the higher rank unit so that a request to continue the input/output operation is executed with a higher priority when the request (such as end of waiting for rotation) to continue the on-line input/output operation under execution is issued simultaneously with the request to resume the dump processing. As a result, the affect of the dump processing to the request to continue the on-line input/output operation is minimized.

Where the differential dump processing in which only the areas updated between the previous dump processing and the start of the current processing are dumped at a high efficiency is to be done, the position information of the update area is designated by the range designation parameter, and whether the designated range is present in the buffer memory or not is checked and the result is informed to the higher rank unit. When the command is received but the data in the designated range is not present in the buffer memory, the prefetching of the updated area into the buffer is started. As a result, high performance and high efficiency differential dump processing is attained while minimizing the affect to the on-line processing.

Further, the speed of information transfer from the buffer memory may be higher than the speed of storing the data read from the disk drive into the buffer memory. As a result, the time of data transfer which is effected by connecting the higher rank unit to the disk controller can be reduced and the busy rate of the higher rank unit and the disk controller is further reduced.

DESCRIPTION OF THE PREFERRED EMBODIMENTS

The preferred embodiments of the present invention are now explained in detail with reference to the drawings.

Figure 1:
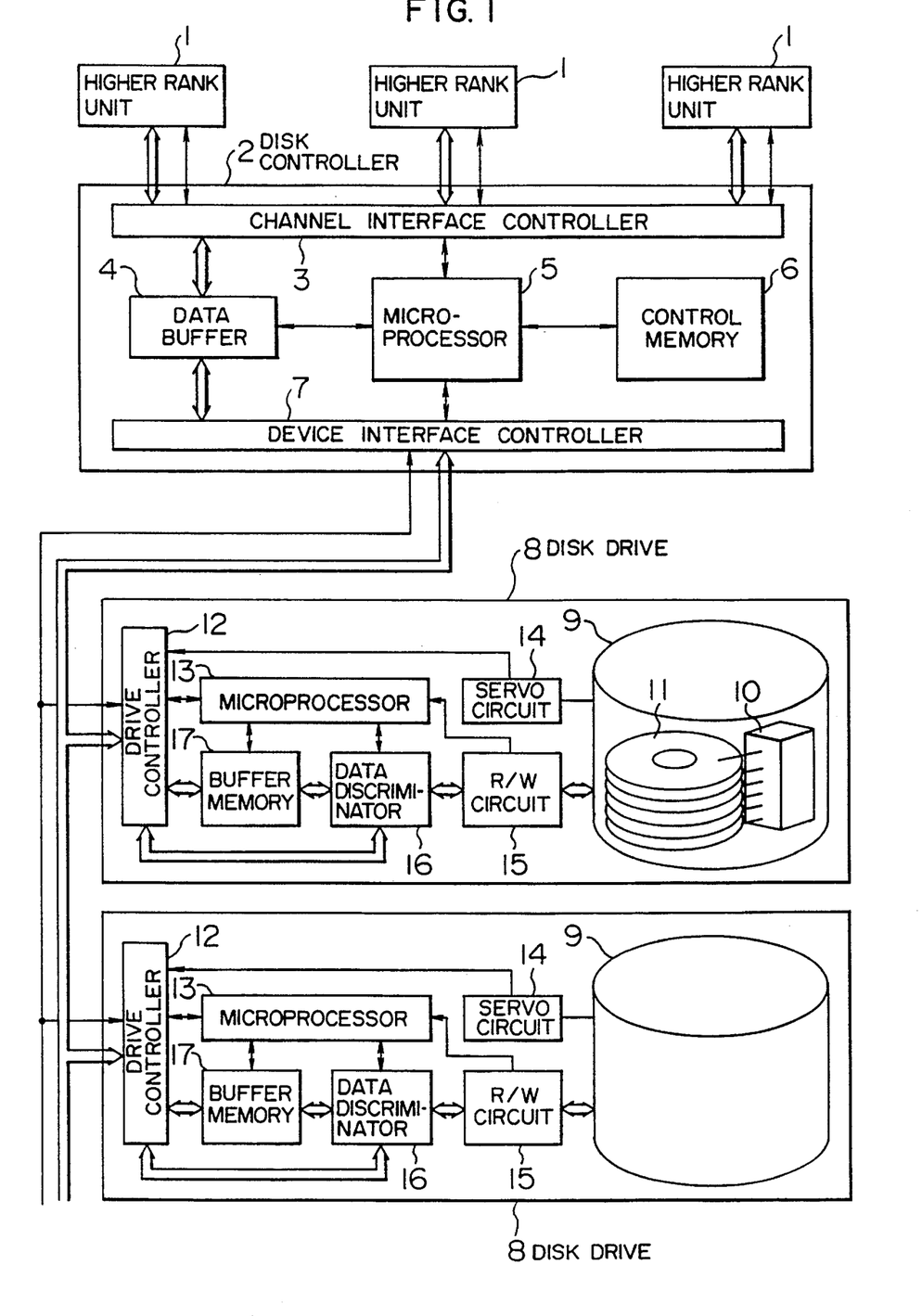
FIG. 1 shows a block diagram of an overall configuration of a first embodiment of the present invention.
Figure 2:
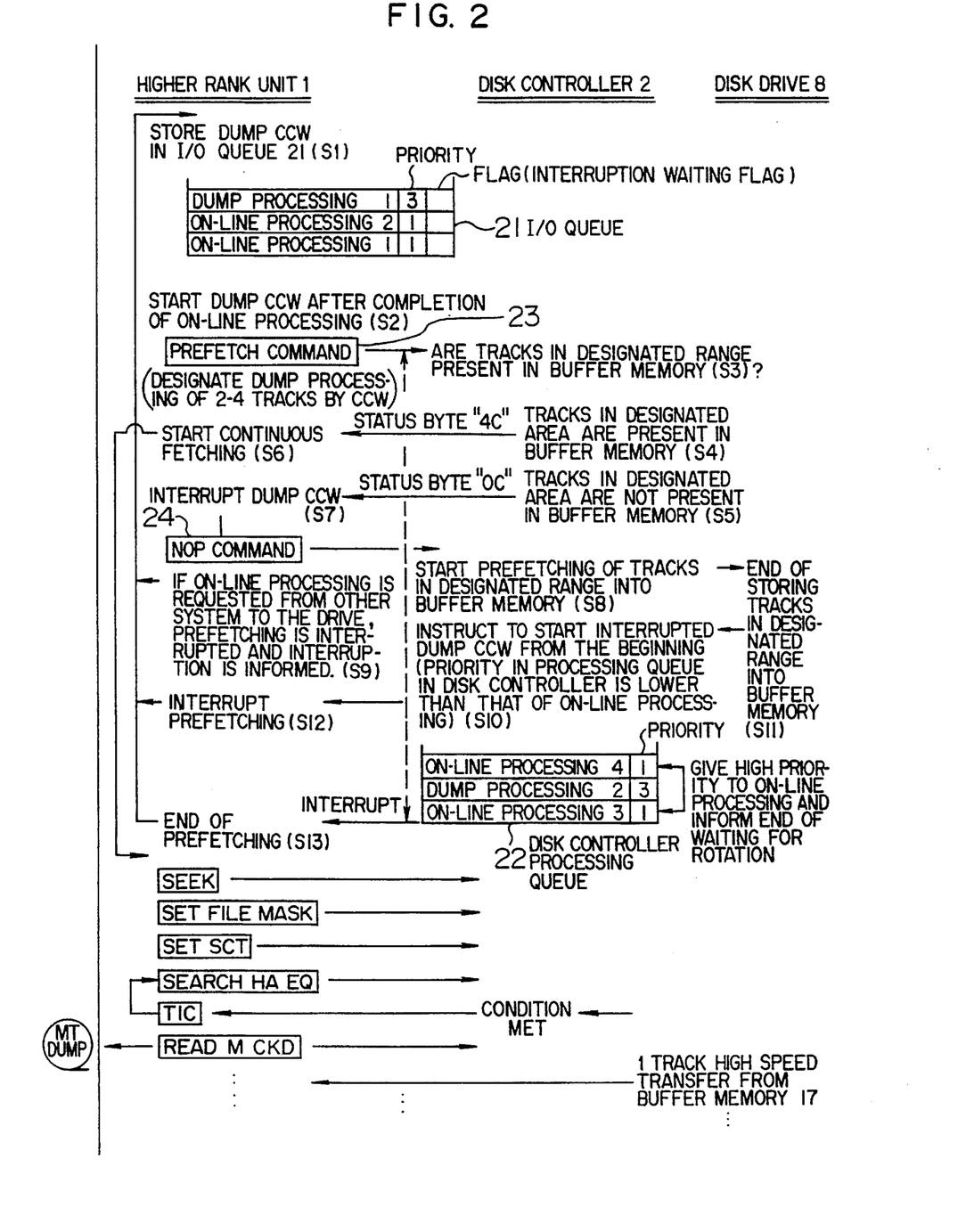
FIG. 2 illustrates an operation of the first embodiment.

FIG. 1 shows a block diagram of an overall configuration of a first embodiment, and FIG. 2 illustrates an operation of a software interface protocol.

In FIG. 1, numeral 1 denotes a higher rank unit, numeral 2 denotes a controller, and numeral 8 denotes a disk drive. The disk controller 2 comprises a channel interface controller 3 which exchanges data with the higher rank unit 1, a device interface controller 7 which exchanges data with the disk drive 8, a data buffer 4 for synchronizing the data transfer, a microprocessor 5 for controlling those units, and a control memory 6. On the other hand, the disk drive 8 comprises a head disk assembly (HDA) 9, a positioning mechanism 10, a disk spindle 11, a servo circuit 14 for controlling the positioning mechanism, a R/W circuit 15 for controlling a read/write operation, a data discriminator 16 for discriminating data, a buffer memory 17 for storing data and transferring the data to the disk controller 2 at a high speed, a drive controller 12 for controlling the entire disk drive 8 and a microprocessor 13 for controlling the buffer memory such as storing the prefetched data into the buffer memory.

The present embodiment is now explained with reference to FIG. 2 which illustrates the operation. In FIG. 2, the operations of the higher rank unit 1, the disk controller 2 and the disk drive 8 are shown in three vertically divided areas, and the connections of the operations are shown by arrows.

When a request for dump processing is issued, the higher rank unit 1 stores it in an I/O queue 21 of the higher rank unit 1 (S1). In the I/O queue 21, a priority of the request for dump processing is set lower than a priority of a request for on-line processing. Accordingly, the dump processing at the sacrifice of the on-line processing in the same higher rank unit is prevented. Namely, the request for the on-line processing is met and the request for the dump processing is executed in the interval between the on-line processings. The I/O queue is provided with an area which stores the priorities of the processing requests and a flag area which is set in an interruption waiting status in which the interruption by interruption/completion of prefetching is monitored.

When the on-line processing is over, the higher rank unit 1 issues a CCW (command chain) for the dump processing to the disk controller 2 (S2). The CCW issues a prefetch command 23 which designates the prefetching of two to four tracks. The two to four tracks are selected because of limitation of the capacity of the buffer memory 17 and for the purpose of preventing one prefetching from taking such a long time to affect to the on-line processing in its own system, although the number of tracks need not be limited to two to four. The prefetch command is a dump command provided by the present invention and it has a function of designating the range of the dump CCW as well as a function of checking whether the tracks in the designated area are stored in the buffer memory 17 in the disk drive 8 or not. In the disk controller 2, the microprocessor 5 stores the range designation parameter of the prefetch command in the control memory 5 and checks whether the tracks in the designated range are stored in the buffer memory 17 of the disk drive 8 or not (S3). The contents of the buffer memory 17 are controlled by the microprocessor 13 in the disk drive 8. The microprocessor 5 in the disk controller 2 reads the stored information of the buffer memory 17 which the microprocessor 13 in the disk drive 8 controls, and reflects the result at a status byte. If the tracks in the designated range are present in the buffer memory 17, a status byte "4C" is sent back (S4). If the tracks in the designated range are not in the buffer memory 17, a status byte "OC" is sent back (S5).

The higher rank unit 1 determines the succeeding process depending on the status byte received. If the status byte is "4C", that is, if the tracks in the designated range are in the buffer memory 17, the dump processing is continued to continuously read the tracks (S6). If the status byte is "OC", that is, if the tracks in the designated range are not present in the buffer memory, the dump processing CCW is interrupted and a no operation (NOP) command (no processing) 24 is issued (S7). The interrupted dump processing CCW waits in the I/O queue 21 until the disk controller requests the resumption. The higher rank unit 1 separately controls the interrupted dump processing CCW by setting a flag.

On the other hand, the microprocessor 5 instructs to the disk drive 8 the prefetching into the buffer memory 17 in order to fetch the data to be dumped which is not present in the buffer memory, into the buffer memory (S8). The prefetching in the range designated by the prefetch command is done by the microprocessor 13 by controlling the servo circuit 14 through the drive controller 12 to activate the positioning mechanism 10 and discriminating the data by the read/write circuit 15 and the data discriminator 16 and storing it in the buffer memory 17. If the request for the on-line processing is issued to the disk drive 8 before the storing into the buffer memory 17 is completed, the microprocessor 5 in the disk controller 2 instructs to stop the prefetching to the microprocessor 13 in the disk drive 8, and issues the interruption of the prefetching to the higher rank unit (S9).

The higher rank unit controls the process request by the I/O queue 21. In the present embodiment, the request for the dump processing is accepted with the highest priority. Even if the request for the on-line processing is issued from the higher rank unit during the dump processing, the request for the on-line processing waits until the dump processing is over. Accordingly, it does not happen that the request for the on-line processing from the higher-rank unit which issued the request for the dump processing is issued to the disk controller but the request for the on-line processing from other higher rank unit to the disk controller may be issued. Accordingly, the request for the on-line processing in the step S9 is the processing request from other system. In the system of FIG. 1, since the dump processing is usually carried out in one higher rank unit, the processing request from other higher rank unit is considered as the request for the on-line processing in the present embodiment.

When the microprocessor 13 is instructed to interrupt the prefetching of the step S9, it stops the fetching of the tracks into the buffer memory 17 at a track boundary during the processing. The range of the tracks fetched into the buffer memory 17 is controlled by the microprocessor, and if the range of store of the buffer memory which is requested next time is partially in the buffer memory, only the remaining portion is stored into the buffer memory 17 by the microprocessor 13. When the storing of the tracks into the buffer memory 17 is over (S11) or the interruption by the on-line processing is requested (S9), the microprocessor 13 in the disk drive 8 detects it and informs it to the microprocessor 5 in the disk controller 2. In response thereto, the microprocessor 5 informs the interruption to the higher rank unit 1, and informs the completion of the processing for the buffer memory 17 (S13) or informs the interruption (S12).

When the microprocessor 5 informs the completion of the prefetching, it may happen that a request to continue the on-line input/output operation (due to the end of waiting for rotation) is simultaneously issued. The microprocessor 5 in the disk controller 2 prepares a disk controller processing queue 22 in the control memory 6, and set a high priority to the request to continue the on-line input/output operation and a low priority to the informing of the end of storing into the buffer memory 17 (S10).

When the request to continue the on-line input/output operation is issued, the microprocessor 5 informs the request to continue the on-line input/output operation to the higher rank unit 1 in accordance with the information of the control memory 6 to prevent the performance of the on-line processing from being degraded. When the prefetching is completed after the NOP command 24 issued by the higher rank unit 1 when the dump processing CCW is interrupted, and there is no possibility of impeding the on-line input/output operation, the microprocessor 5 informs the interruption to the higher rank unit 1.

Whether it is the competition or the interruption of the prefetching, the higher rank unit 1, when it receives the interruption resumes the execution of the dump processing CCW from the beginning, which CCW has the interruption waiting flag thereof set in the I/O queue 21 (S2). Again, if there is a request for the on-line processing in the I/O queue 21, the on-line processing is given a high priority. The prefetch command 23 is issued, and if the tracks in the designated range are present in the buffer memory 17, the continuous fetching is started (S6). Namely, where all tracks in the designated range are present in the buffer memory 17, there is no mechanical waiting time due to a seek/search command and a plurality of tracks may be read in one step without affecting to the on-line processing. Thus, very high performance and high efficiency dump processing is attained.

Figure 3:
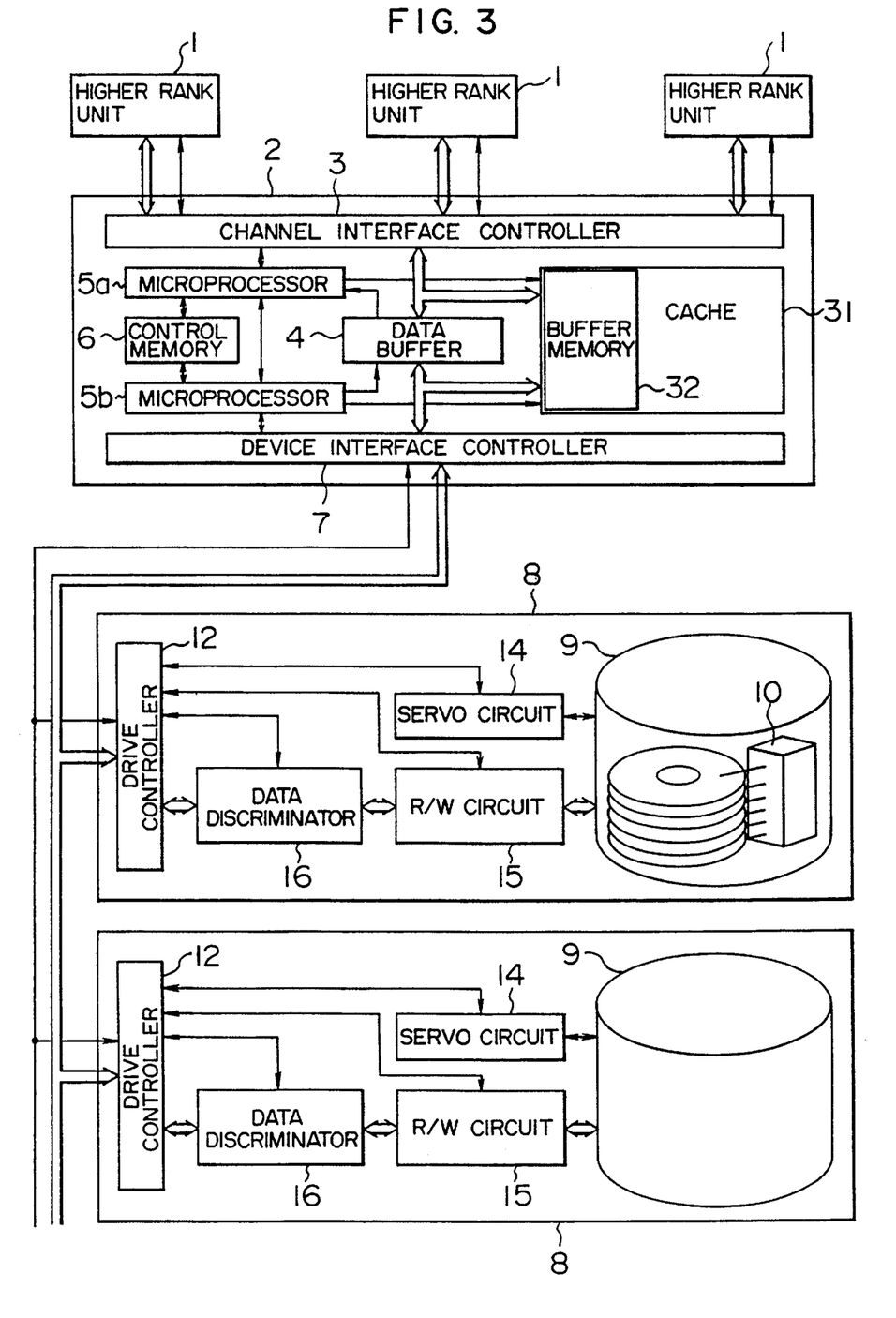
FIG. 3 shows a block diagram of an overall configuration of a second embodiment.

FIG. 3 shows a block diagram of an overall configuration of the second embodiment of the present invention. The like elements to those shown in FIG. 1 are designated by the like numerals.

In the first embodiment, the buffer memory 17 for the dump processing is provided for each of the disk drives 8. In the present embodiment, a partial area of a cache memory 31 in the disk controller 2 is used as a buffer memory 32 for the dumping. Accordingly, the buffer memory 17 in each of the disk drives 8 is eliminated and two microprocessors 5a and 5b are provided in the disk controller 2. The microprocessor 5a plays a role for the processing of the higher rank unit and the microprocessor 5b plays a role for the processing of the disk controller.

Figure 4:
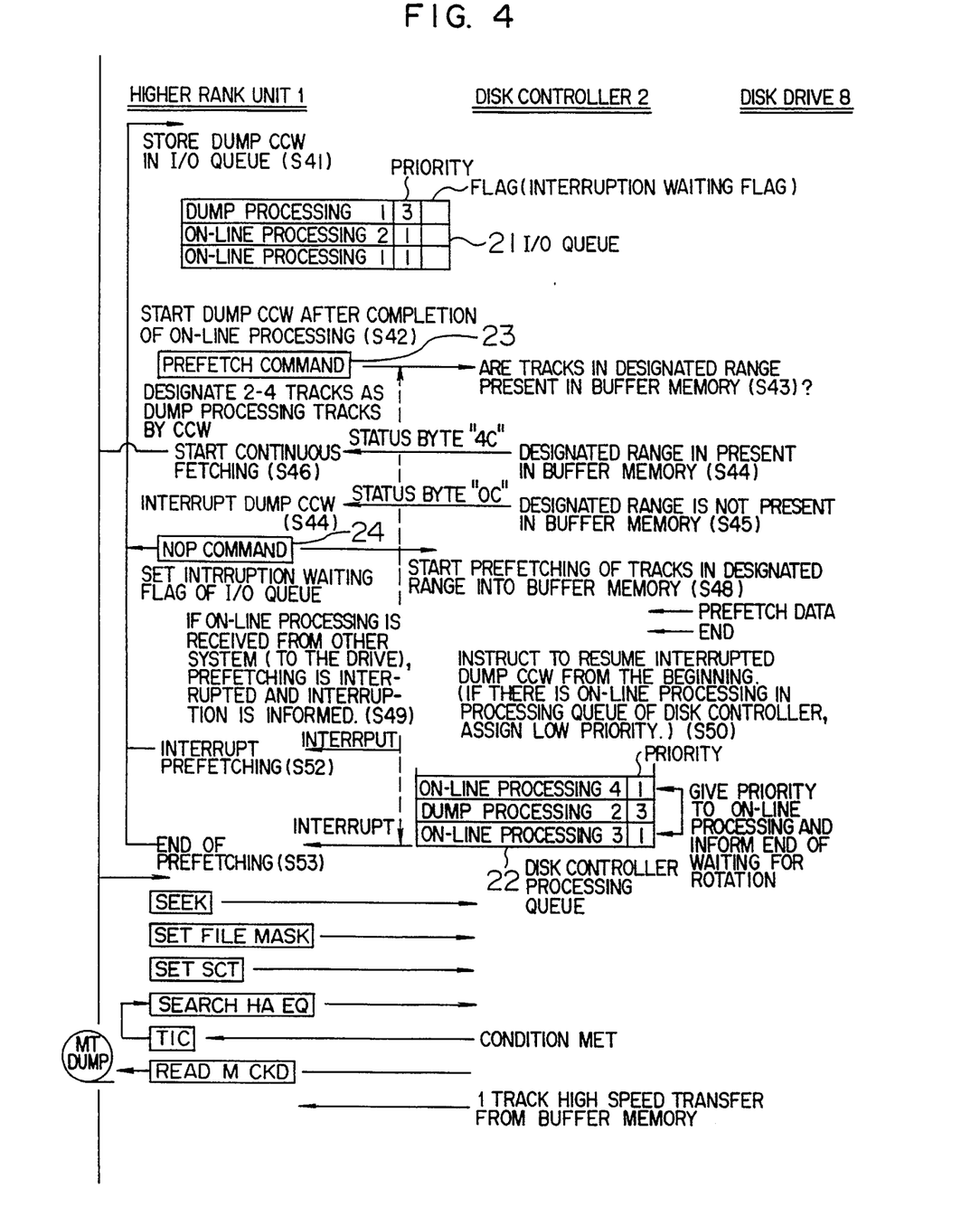
FIG. 4 illustrates an operation of the second embodiment.

The operation of the present embodiment is now explained with reference to FIG. 4.

Like in the first embodiment, when the request for the dump processing is issued, the higher rank unit 1 stores it in the I/O queue of the higher rank unit 1 (S41). In the I/O queue 21, the priority for the request for the dump processing is set lower than the request for the on-line processing. As a result, it does not happen that the dump processing is carried out with the degradation of the performance of the on-line processing in one higher rank unit. The request for the on-line processing is met and the request for the dump processing is met in the interval between the on-line processings.

After the on-line processing is over, the higher rank unit 1 issues the dump processing CCW (command chain) to the disk controller 2 (S42). The CCW issues the prefetch command 23 with the prefetching of two to four tracks. The prefetch command 23 has a function of designating the range of the dump processing CCW as well as a function of checking whether the tracks in the designated range are present in the buffer memory 8 in the disk controller 2. As described above, in the present embodiment, the buffer memory 17 in the disk drive 8 in the first embodiment is implemented by a portion of the cache memory 31 in the disk controller 2. In the disk controller 2, when the microprocessor 5a stores the range designation parameter of the prefetch command into the control memory 6, it checks whether the tracks in the designated range are present in the buffer memory 32 or not (S43). The buffer memory 32 is divided into areas each being capable of storing two to four tracks for each of the disk drives 8 which are under control of the disk controller 2, and they are controlled by the microprocessor 5a. The control information is stored in the control memory 6. The microprocessor 5a reads the control information of the buffer memory 32 from the control memory 6 and reflects the presence or absence of the tracks in the designated range in the buffer memory 32 to the status byte. If the tracks in the designated range are present in the buffer memory 32, a status byte "4C" is sent back (S44). If the tracks in the designated range are not present in the buffer memory 32, a status byte "0C" is sent back (S45).

The higher rank unit 1 determines the succeeding process depending on the status byte received. If the tracks in the designated range are present in the buffer memory 32, the dump processing is continued to continuously read the tracks (S46). If the tracks in the designated range are not present in the buffer memory 32, the dump processing CCW is interrupted and a NOP command is issued (S47). The interrupted dump processing CCW waits in the I/O queue 21 until the disk controller 2 requests the resumption. The higher rank unit separately controls the interrupted dump processing CCW by setting an interruption waiting flag.

On the other hand, the microprocessor 5a instructs the prefetching to the microprocessor 5b (S48). The microprocessor 5b reads the designated range information stored in the control memory 6 and instructs to the drive controller 12 of the disk drive 8 to read the data. Namely, it controls the positioning mechanism 10 through the servo circuit 14, reads the data from the corresponding head and cylinder of the disk spindle 11, and transfers it to the disk controller 2 through the read/write circuit 15 and the data discriminator 16. The microprocessor 5b stores the contents of the tracks in the range designated by the higher rank unit 1 into the area of the buffer memory 32 corresponding to the disk drive 8.

If the request for the on-line processing is issued to the disk drive 8 before the storing into the buffer memory 32 is completed, the microprocessor 5a of the disk controller 2 instructs to the microprocessor 5b to stop the prefetching (S49). The microprocessor 5b responds thereto to stop the fetching of the tracks into the buffer memory 32 at a track boundary during the processing. The range of the tracks read into the buffer memory is stored in the control memory 6, and if the range of storage in the buffer memory at the next request is partially present in the buffer memory, the microprocessor 5b transfers only the remaining portion to the buffer memory 32. If the storing of the tracks into the buffer memory 32 is completed (S53) or the on-line processing is interrupted (S52), the disk controller 2 informs the interruption to the higher rank unit 1 and informs the completion/interruption of the processing for the buffer memory 32.

Like in the first embodiment, when the completion/interruption of the processing is informed, it may happen that a request to continue the on-line input/output operation (due to the end of waiting for rotation) is simultaneously issued. In the disk controller 2, the microprocessor 5a examines the disk controller processing queue 22 in the control memory 6 to determine whether the request to continue the on-line input/output operation which was set by the microprocessor 5a has been issued or not. If it has been issued, the request to continue the on-line processing is given a priority and the interruption is informed to the higher rank unit 1 with a higher priority than to the report of the completion/interruption of the prefetching.

By such a fine control, the completion/interruption of the prefetching can be informed without affecting to the on-line processing. If the prefetching is over after the NOP command has been issued by the higher rank unit 1 in interrupting the dump processing CCW and there is not possibility that the on-line processing of other system is impeded, the microprocessor 5a informs the interruption to the higher rank unit.

Like in the first embodiment, whether the prefetching is completed or interrupted, the higher rank unit 1, when it receives the interruption, resumes the execution of the dump processing CCW in the I/O queue 21, which CCW has the interruption waiting flag thereof set. Again, if there is a request for the on-line processing in the I/O queue 21, the on-line processing is given a priority. The prefetch command 23 is issued, and if the tracks in the designated range are present in the buffer memory 32, the continuous fetching is started. Namely, where all tracks in the designated range are present in the buffer memory 32, there is no mechanical waiting time by a seek/search command, and the collective fetching of a plurality of tracks is attained without affecting to the on-line processing as described before. Accordingly, very high performance and high efficiency dump processing is attained.

Figure 5:
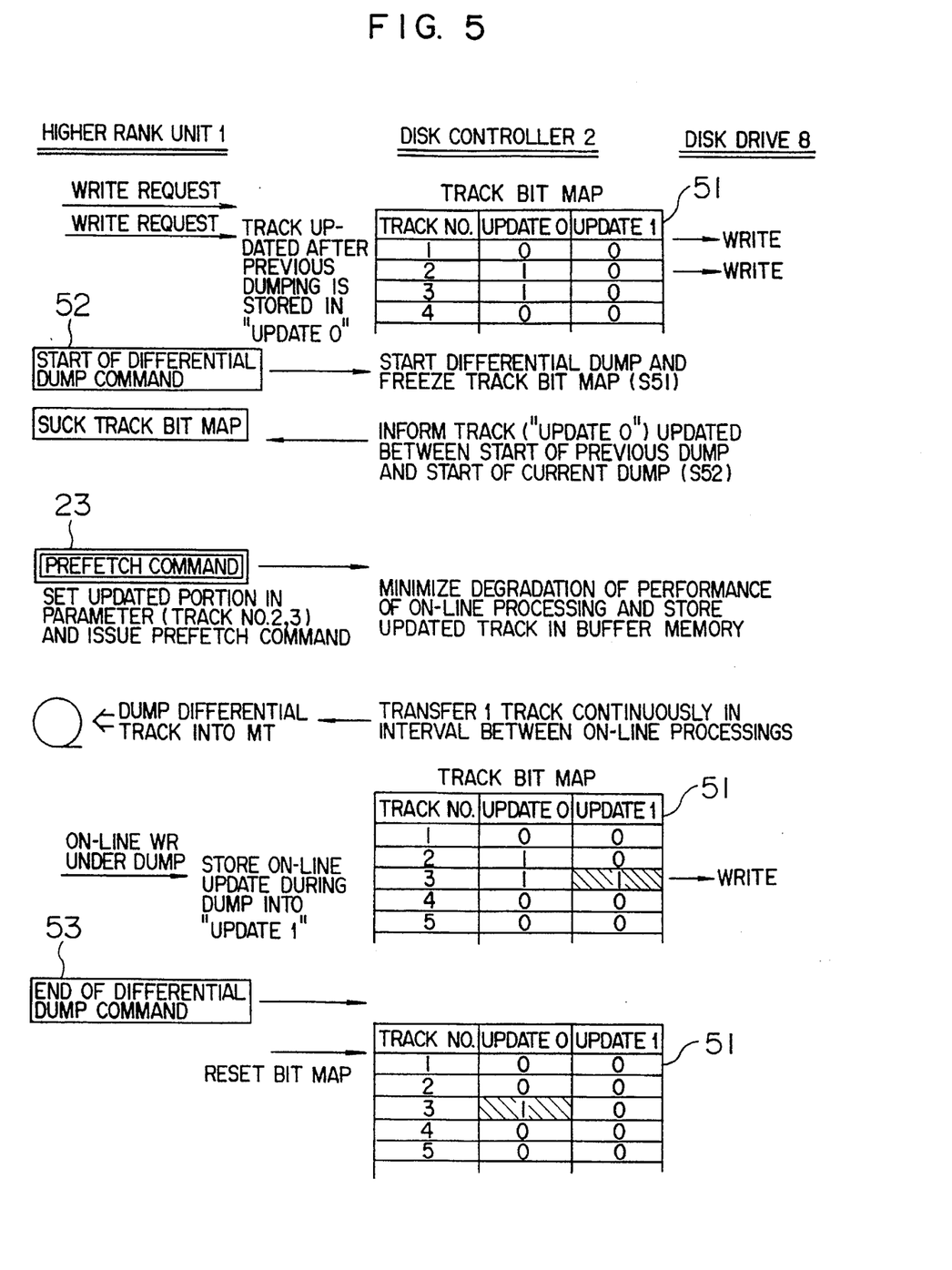
FIG. 5 illustrates an operation of a third embodiment.

FIG. 5 illustrates an operation of a software interface protocol in a third embodiment of the present invention. The overall configuration may be readily achieved by either the first embodiment or the second embodiment, and hence it is omitted here.

In the differential dumping, when a disk volume is to be dumped, only the portion updated from the previously dumped content is stored in the disk controller 2, and only the updated portion is dumped by the higher rank unit. In the present embodiment, the present invention is applied to the differential dumping to attain more efficient and higher performance dumping.

In FIG. 5, the tracks updated after the start of the previous dumping are stored in an update 0 field of a track bit map 51 in the disk controller 2. In the present example, the track Nos. 2 and 3 have been updated. When the disk controller 2 receives a start of differential dumping command 52, it freezes the track bit map 51 (S52) and the subsequent updating is reflected to an update 1 field.

The higher rank unit 1 sucks the track bit map 51 from the disk controller (S52) and dumps only the updated tracks (track Nos. 2 and 3 in the present example). The high speed dumping method of the present invention shown in the previous embodiment is applied, and the high performance and high efficiency dump processing is attained while minimizing the degradation of the performance of the on-line processing. The process is similar to that of the first embodiment or the second embodiment except that the update information from the track bit map 51 is set in the prefetch command.

The on-line update processing during the dumping is set in the update 1 field in the track bit map 51 so that it is dumped without fail in the next dump processing. The update 1 field is reflected to the update 0 field by the end of differential dumping command. Then, the process returns to an initial state.

While the embodiments of the present invention have been explained, various modifications and changes may be made without departing from the scope of the present invention. For example, a catch-up transfer system in which the completion of the prefetching is reported at a timing of synchronism of the reading from the buffer memory and the reading from the drive upon completion of the entire transfer may be used to further minimize the device busy rate due to the dump processing.

In accordance with the disk controller of the present invention, whether the processing request from the higher rank unit is the request for the dump processing or the request for the on-line processing is determined, and the processing is done in accordance with the determination. Accordingly, high performance and high efficiency dump processing is attained with minimum degradation of the performance of the on-line input/output operation.

If the request for the on-line input/output operation is issued during the dump processing, the on-line processing is given a high priority. Accordingly, the dump processing is done during the on-line processing without degrading the performance of the on-line processing. Since the data can be continuously read from the buffer memory, high performance dump processing is attained.

When the differential dump processing is applied to the present invention, the range of the dump processing is narrowed and the degradation of the performance of the on-line input/output operation is minimized. Accordingly, higher performance and higher efficiency dumping is attained.

We claim:

1. A data storing method comprising the steps of:

(a) issuing from a higher rank unit a request for dump processing adding thereto a prefetch command in which a range designating parameter for designating a range of data to be copied is set upon occurrence of a request for dump processing to copy data stored in a disk drive to another storage unit;

(b) receiving the request for dump processing adding the prefetch command in a disk controller, checking whether or not data in the range designated by the range designating parameter of the prefetch command exists in a buffer memory for dump processing in said disk drive or said disk controller and reporting a result of checking to the higher rank unit which issued the request for dump processing;

(c) continuing execution of the requested dump processing to copy data in the buffer memory to said another storage unit, when the data in the range designated by said range designating parameter exists in the buffer memory;

(d) interrupting execution of the request for dump processing in a queue in said disk controller and storing data designated by the range designating parameter in the buffer memory, when the data in the range designated by said range designating parameter does not exist in the buffer memory;

(e) checking whether there exists continuing on-line processing having a higher priority than the request for dump processing when the data stored in said buffer memory is completed and an interrupt of the completion of the data store is reported to said higher rank unit;

(f) reporting an interrupt of a request for continuing the on-line processing prior to the interrupt of the completion of the data storing when the continuing on-line processing exists; and (g) reporting the interrupt of the completion of the data store to said higher rank unit and requesting said higher rank unit to reissue the request for dump processing being interrupted when the continuing on-line processing does not exist.

2. A method according to claim 1, wherein said step (d) comprises the steps of:

(d1) interrupting the storing of data in said buffer memory for the request for dump processing when said disk controller receives a request for on-line processing having a higher priority than the request for dump processing during the interruption of execution of the requested dump processing, and checking whether there occurs continuing on-line processing having a higher priority than the request for dump processing;

(d2) reporting an interrupt of a request for continuing the on-line processing when continuing on-line processing exists; and (d3) reporting the interruption of the storing of data to said higher rank unit and requesting said higher rank unit when the continuing on-line processing does not exist.

3. A method according to claim 2, wherein said disk controller requests said higher rank unit to reissue the request for dump processing being interrupted when execution of the requested on-line processing has been completed.

4. A method according to claim 2, wherein the data store which is a prefetch processing in the buffer memory is carried out on a track basis in said disk drive and the interruption of the storing of data is carried out on a boundary of tracks.

5. A method according to claim 1, wherein the reissued request from said higher rank unit is a request containing a prefetch command which is the same as the previous dump processing request, and said disk controller executes the reissued dump processing request from the beginning.

6. A data storage system comprising:

a disk drive means for storing data;

a higher rank unit for issuing a plurality of types of processing requests one of which is a request for dump processing, said request for dump processing being a request to retrieve data stored in said disk drive means to permit said higher rank unit to copy the retrieved data to another storage means; and a disk controller connected to said higher rank unit and said disk drive means, for controlling transmission and reception of data to said higher rank unit and transmission and reception of data to said disk drive means, and managing reports to said higher rank unit;

wherein said higher rank unit issues to said disk controller a request for dump processing adding thereto a particular command;

wherein said particular command is a prefetch command in which a range designating parameter for designating a range of data to be copied by said request for dump process is set, said prefetch command having a function of instructing said disk controller to check whether or not data in the range designated by said range designating parameter exists in a buffer memory provided in said disk drive means or said disk controller; and wherein said disk controller manages processing requests from said higher rank unit in a queue by adding priorities to the processing requests so that, when the data in the range designated by said range designating parameter of said prefetch command does not exist in said buffer memory, said disk controller stores the data designated by said range designating parameter in said buffer memory, and thereafter said disk controller reports to said higher rank unit an interrupt for completion of a request for continuing on-line processing more preferential to an interrupt for completion of data store in said buffer memory, if there occurs the request for continuing on-line processing having a higher priority than that of the request for dump processing.

7. A data storage system according to claim 6, wherein said disk controller manages processing requests from said higher rank unit in a queue by adding priorities to the processing requests so that, when said disk controller receives from another higher rank unit a request for on-line processing having a higher priority than that of said request for dump processing while said disk controller is storing data designated by said range designating parameter in said buffer memory, said disk controller suspends the storing of data in said buffer memory, and thereafter where there occurs a request for continuing the on-line processing in reporting a suspension of the storing of data to said higher rank unit which issued the request for dump processing, said disk controller reports to said higher rank unit an interrupt for completion of the request for continuing on-line processing more preferential to an interrupt for completion of the storing of data in said buffer memory.

* * * * *